United States Patent [19]

van Broekhoven et al.

[11] Patent Number: 5,010,171

[45] Date of Patent: Apr. 23, 1991

[54] CARBON MONOXIDE/OLEFIN POLYMERIZATION WITH CATALYST COMPRISING P. BIDENTATE LIGAND HAVING NON-HYDROCARBYL SUBSTITUENT

[75] Inventors: Johannes A. M. van Broekhoven; Wiebren A. Miedema, both of Amsterdam, Netherlands

[73] Assignee: Shell Oil Company, Houston, Tex.

[21] Appl. No.: 408,012

[22] Filed: Sep. 15, 1989

[30] Foreign Application Priority Data

Sep. 22, 1988 [NL] Netherlands ............... 8802347

[51] Int. Cl.$^5$ ............................................. C08G 67/02
[52] U.S. Cl. ...................................... 528/392; 502/162
[58] Field of Search ............................................. 528/392

[56] References Cited

FOREIGN PATENT DOCUMENTS

| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |

*Primary Examiner*—Harold D. Anderson

[57] ABSTRACT

Catalyst composition solutions, useful in the production of linear alternating polymer of carbon monoxide and at least one ethylenically unsaturated hydrocarbon, show storage stability and uniform high activity when prepared by adding a non-hydrocarbyl bidentate ligand of phosphorus and a palladium alkanoate to an aprotic, polar catalyst composition solvent followed by a halogen-containing aliphatic monocarboxylic acid having a pKa below 2.

10 Claims, No Drawings

CARBON MONOXIDE/OLEFIN POLYMERIZATION WITH CATALYST COMPRISING P. BIDENTATE LIGAND HAVING NON-HYDROCARBYL SUBSTITUENT

FIELD OF THE INVENTION

This invention relates to catalyst solutions useful in the production of linear alternating polymers of carbon monoxide and at least one ethylenically unsaturated hydrocarbon. More particularly, the invention relates to such catalyst solutions which exhibit good storage stability and high activity in the polymerization process.

BACKGROUND OF THE INVENTION

The class of linear alternating polymers of carbon monoxide and at least one ethylenically unsaturated hydrocarbon is known in the art. Such polymers were produced by Nozaki in the presence of arylphosphine complexes of palladium moieties and certain inert solvents. U.S. Pat. No. 3,694,412 is illustrative. More recently, these linear alternating polymers have become of greater interest because of the greater availability of the polymers. The more recent processes for the production of the linear alternating polymers, now becoming known as polyketones or polyketone polymers, are illustrated by a number of published European Patent Application Nos. including 121,965, 181,014, 213,671 and 257,663. The process, now broadly conventional, comprises the use of a catalyst composition formed from a compound of a Group VIII metal selected from palladium, cobalt or nickel, the anion of a non-hydrohalogenic acid having a pKa below about 6, preferably below 2, and a bidentate ligand of phosphorus, arsenic or antimony. The scope of the polymerization process is extensive but, without wishing to be limited, a generally preferred catalyst composition is formed from a compound of palladium, particularly a palladium alkanoate such as palladium acetate, the anion of trifluoroacetic acid or p-toluenesulfonic acid and a bidentate ligand of phosphorus selected from 1,3-bis(diphenyl-phosphino)propane or 1,3-bis[di(2-methoxyphenyl)-phosphino]-propane.

The resulting polyketone polymers are relatively high molecular weight material having established utility as premium thermoplastics in the production of a variety of shaped articles, e.g., as containers for food and drink, by methods well known for the processing of thermoplastics such as extrusion, injection molding or thermoforming.

In a typical polymerization process the monomer reactants are contacted in the presence of the catalyst composition in an inert reaction diluent such as methanol. The methanol serves as the reaction diluent but also as a primary solvent for the catalyst composition. For the latter purpose, a second solvent such as an aromatic hydrocarbon, e.g., toluene, is optionally present. U.S. 4,921,938, exemplifies the use of a polar aprotic solvent in the production of catalyst composition solutions. The activity of the catalyst composition and/or the stability of the catalyst composition depends upon a number of factors including the particular catalyst composition components employed, the order in which the components are mixed and the particular reaction diluent employed. In the case of bidentate phosphorus ligands which are hydrocarbyl, e.g., 1,3-bis(diphenylphosphino)propane, in a lower alkanol reaction diluent, catalyst compositions in which the phosphine, then the palladium salt and finally the acid containing the desired anion are provided demonstrate higher activity than catalyst compositions prepared by a different order of mixing. Consecutive samples of such a catalyst solution in alkanol when produced in bulk will show a decrease in activity as well as produce products of decreasing limiting viscosity number (LVN) which is a measure of molecular weight. This apparent lack of storage stability is detrimental when it is desired to conduct a number of polymerizations from a single catalyst composition preparation. It would be of advantage to provide catalyst compositions of relatively constant high activity and which exhibit greater stability over time.

SUMMARY OF THE INVENTION

The present invention provides improved catalyst composition solutions useful in the production of linear alternating polymers of carbon monoxide and at least one ethylenically unsaturated hydrocarbon. More particularly, the invention provides catalyst composition solutions comprising a palladium alkanoate, certain halogenated aliphatic monocarboxylic acid and a non-hydrocarbyl bidentate phosphorus ligand, in an aprotic solvent. Such catalyst solutions retain activity over time while affording relatively constant molecular weight of the polymer product through a higher degree of storage stability.

DESCRIPTION OF THE INVENTION

The present invention provides catalyst composition solutions whose activity during storage over time remains relatively high and which, when employed in polymerization processes, result in sequential production of polymer products of relatively constant molecular weight. Related catalyst composition solutions, although useful when freshly prepared, are not as storage stable and if employed in increments over time will show decreasing activity and afford polymer products of decreasing molecular weight.

The ethylenically unsaturated hydrocarbons which are useful as precursors of the polyketone polymers have up to 20 carbon atoms inclusive, preferably up to 10 carbon atoms inclusive, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are sytrene, p-methylstyrene, p-ethylstyrene and m-isopropylstyrene. Preferred polyketone polymers are copolymers of carbon monoxide and ethylene or terpolymers of carbon monoxide, ethylene and a second hydrocarbon of at least 3 carbon atoms, particularly an α-olefin such as propylene.

When the production of the preferred terpolymers is desired, there will be within the terpolymer at least about two units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polymers is therefore represented by the following repeating formula $$\text{+CO+CH}_2\text{—CH}\text{)}\text{]}_x\text{[CO+G)}\text{]}_y\text{—} \qquad (I)$$

wherein G is the moiety of an ethylenically unsaturated hydocarbon of at least 3 carbon atoms polymerized through the ethylenic unsaturation. The —CO+CH$_2$—CH$_2$+— units and the —CO+G+— units are found randomly throughout the polymer chain and the ratio of y:x is no more than about 0.5. In the modification where copolymers are to be produced there will be no second hydrocarbon present and such polymers are represented by the above formula I wherein y is 0. When y is other than 0, i.e., terpolymers are to be produced, the ratio of y:x will preferably be from about 10 to about 100. The end groups or "caps" of the polymer chain will depend upon what materials were present during the production of the polymer, and how and whether the polymer has been purified. The precise nature of the end groups does not appear to be of any particular substantial significance so far as the overall properties of the polymer are concerned so that the polymers are fairly represented by the polymer chain as depicted above.

Of particular interest are the polyketone polymers of number average molecular weight from about 1000 to about 200,000, particularly those polymers of number average molecular weight from about 20,000 to about 90,000, as determined by gel permeation chromatography. The physical properties of the polymers will depend in part on whether the polymer is a copolymer or a terpolymer and, in the case of terpolymers, the nature of and the proportion of the second hydrocarbon present. Typical melting points for such polymers are from about 175° C. to about 300° C., more often from about 210° C. to about 275° C. The polymers will have a limiting viscosity number (LVN), measured in m-cresol at 60° C., of from about 0.5 dl/g to about 10 dl/g, but preferably from about 0.8 dl/g to about 4 dl/g.

The catalyst compositions of the invention are formed from a palladium alkanoate, and palladium alkanoates such as palladium acetate, palladium propionate, palladium hexanoate and palladium octanoate are satisfactory although palladium acetate is preferred. The bidentate phosphorus ligand, broadly expressed, is a ligand of the formula

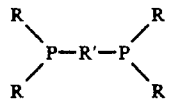

$$(II)$$

Although ligands wherein R is hydrocarbyl, of up to 10 carbon atoms, e.g., phenyl, tolyl, xylyl or naphthyl, are broadly useful in the production of polyketone polymers, the ligands leading to the higher activity and more stable catalyst compositions and thus the ligands useful in the catalyst composition solutions of the invention are those wherein R independently is aromatic having a polar, non-hydrocarbyl substituent on at least one carbon atom ortho to the carbon atom through which R is connected to the indicated phosphorus. The preferred R substituents are those wherein the non-hydrocarbyl substituent is lower alkoxy of up to 4 carbon atoms and particularly methoxy. Illustrative of such R groups are 2-methoxyphenyl, 2-ethoxyphenyl, 2,4-dimethoxyphenyl, 2-methoxy-4-butoxyphenyl, 2,6-dimethoxyphenyl and 2,4,6-trimethoxyphenyl. Especially preferred as the R group is 2-methoxyphenyl. The R' group is an organic bridging group of up to 10 carbon atoms inclusive and from 2 to 4 carbon atoms in the phosphorus-phosphorus bridge. The preferred R' groups are polymethylene groups, i.e., groups of the formula —(CH$_2$)$_n$— wherein n is an integer from 2 to 4 inclusive. Particularly preferred as the R' group is the trimethylene or —CH$_2$—CH$_2$—CH$_2$— group. The preferred bidentate phosphate ligand is therefore 1,3-bis[di(2-methoxyphenyl)phosphino]propane. The anion component of the catalyst composition is the anion of a halogen-containing aliphatic carboxylic acid having a pKa (measured in water at 18° C.) of below 2. Such acids include trifluoroacetic acid, trichloroacetic acid and difluoroacetic acid. Trifluoroacetic acid is preferred. Although other methods are available for providing the anion to the catalyst composition, e.g., as the metal salt, the preferred method of providing the anion is as the free acid.

In a typical polymerization to produce the linear alternating polymers of carbon monoxide and at least one ethylenically unsaturated hydrocarbon, sufficient catalyst composition should be employed to provide from about $1 \times 10^{-7}$ mole to about $1 \times 10^{-3}$ mole of palladium per mole of ethylenically unsaturated hydrocarbon. It is preferred to provide from about $1 \times 10^{-6}$ mole to about $1 \times 10^{-4}$ mole of palladium per mole of total unsaturated hydrocarbon. The phosphine ligand is employed in a quantity from about 1 mole to about 1.5 mole per mole of palladium and preferably from about 1 mole to about 1.2 mole per mole of palladium. The anion should be present in an amount of from about 7.5 moles to about 30 moles per mole of palladium and preferably from about 10 moles to about 25 moles of anion are preferred.

It is useful on occasion to include within the catalyst composition as a fourth component an organic oxidizing agent. Quinones are useful for this purpose and benzoquinones, naphthoquinones and anthraquinones are satisfactory. The 1,4-quinones are preferred over the corresponding 1,2-quinones and 1,4-benzoquinone is particularly preferred. The use of a quinone is optional as stated and not required, but if quinone is employed in the catalyst composition amounts up to 1000 moles per mole of palladium are satisfactory. When quinone is present, amounts of quinone from about 25 moles to about 250 moles per mole of palladium are preferred.

The catalyst composition solutions are produced by providing the catalyst composition components to an aprotic, polar catalyst composition solvent. Such solvents include aliphatic ketones such as acetone and methyl ethyl ketone, aliphatic carboxylic acid esters such as methyl acetate, ethyl acetate and methyl propionate, aliphatic ethers such as acyclic ethers, e.g., dimethyl ether of diethylene glycol and dimethyl ether of tetraethylene glycol, as well as cyclic ethers, e.g., dioxane and tetrahydrofuran, lactones such as gamma-butyrolactone, N-alkyl aminides such as N-methyl-2-pyrrolidone and sulfones such as sulfolane. The lower alkanones, particularly acetone and methyl ethyl ketone, and alkyl alkanoates such as methyl acetate are a preferred class of catalyst composition solvents. The catalyst composition solutions are produced by adding the catalyst composition components to the catalyst composition solvent. The bidentate phosphorus ligand or the palladium alkanoate should be supplied first but the order of adding these components is not critical. The acid containing the desired anion should be provided last. The resulting catalyst composition solution demonstrates improved storage stability and provides relatively constant high activity for sequential polymerization processes conducted over time to produce linear alternating polymer of carbon monoxide and at least one ethylenically unsaturated hydrocarbon.

The polymerization processes are conducted by contacting the carbon monoxide and hydrocarbon reactants under polymerization conditions in the presence of the catalyst composition in an inert reaction diluent. Suitable reaction diluents are lower alkanols such as methanol and ethanol. Methanol is the preferred polymerization diluent. Typical polymerization conditions include elevated temperature and pressure. The reaction temperature is generally within the range from about 40° C. to about 120° C. although temperatures from about 50° C. to about 100° C. are preferred. The polymerization pressure is from about 20 bar to about 150 bar, but more often from about 30 bar to about 100 bar. Within the reaction mixture the molar ratio of total ethylenically unsaturated hydrocarbon to carbon monoxide should be from about 10:1 to about 1:5 but preferably from about 5:1 to about 1:2.

During polymerization the contact of the reactants and catalyst composition is maintained by conventional methods such as shaking or stirring. Subsequent to reaction the polymerization is terminated as by cooling the product mixture to ambient temperature and releasing the pressure. The polymer product is substantially insoluble in the reaction diluent and is recovered by well known procedures such as filtration or decantation.

The polyketone polymer product is a thermoplastic material and is processed by the methods conventionally employed for such materials, e.g., injection molding, extrusion or thermoforming, into a variety of shaped articles of established utility including wire and cable, films and sheets useful in packaging applications and containers for food and drink.

The invention is further illustrated by the following Comparative Examples (not of the invention) and the following Illustrative Embodiments. All carbon monoxide/ethylene/propylene terpolymers produced were determined by $^{13}$C-NMR analysis to be linear and consist of $-CO+C_2H_4+$ units and $-CO+C_3H_6+$ units randomly distributed within the terpolymer. The LVN of each polymer was determined in m-cresol at 60° C.

COMPARATIVE EXAMPLE I

A catalyst composition solution was prepared by the sequential addition to 45 ml of methanol, in a nitrogen atmosphere with stirring, of a solution of 0.12 mmol 1,3-bis[di(2-methoxyphenyl)phosphino]propane in 15 ml toluene, 0.1 mmol palladium acetate and 2 mmol of trifluoroacetic acid.

COMPARATIVE EXAMPLE II

A terpolymer of carbon monoxide, ethylene and propylene was produced by charging 180 ml of methanol to a mechanically stirred autoclave of 300 ml capacity. The air present in the autoclave was removed by adding carbon monoxide to a pressure of 50 bar and then releasing the pressure a total of three times. The contents of the autoclave were heated to 80° C. and ethylene and carbon dioxide were added in amounts sufficient to give partial pressures of 22 bar and 28 bar respectively. Subsequently, 6 ml of fresh catalyst solution as prepared in Comparative Example I was introduced and during the reaction which followed the pressure was kept constant by the addition of an equimolar mixture of carbon dioxide and ethylene. After 2 hours, the polymerization was terminated by cooling the autoclave and contents to ambient temperature and releasing the pressure. The terpolymer product was recovered by filtration, washed with methanol and dried at 70° C.

The yield of terpolymer was 14.8 g produced at a rate of 7.0 kg terpolymer per gram palladium hour. The terpolymer had a melting point of 225° C. and an LVN of 2.2 dl/g.

COMPARATIVE EXAMPLE III

A carbon monoxide/ethylene/propylene terpolymer was produced by the procedure of Comparative Example II except that the 6 ml of catalyst solution was taken from a stock solution prepared 10 days before use. The yield of terpolymer was 15.3 g. The terpolymer had a melting point of 224° C. and an LVN of 1.8 dl/g.

COMPARATIVE EXAMPLE IV

A carbon monoxide/ethylene/propylene terpolymer was produced by the procedure of Comparative Example II except that the 6 ml of catalyst solution was taken from a stock solution prepared 20 days before use. The yield of terpolymer was 14.0 g. The terpolymer had a melting point of 224° C. and an LVN of 1.5 dl/g. The rate of polymerization was 6.6 kg terpolymer per gram palladium hour.

COMPARATIVE EXAMPLE V

A carbon monoxide/ethylene/propylene terpolymer was produced by the procedure of Comparative Example II except that the 6 ml of catalyst solution was taken from a stock solution prepared 30 days before use. The yield of terpolymer was 15.0 g. The terpolymer had a melting point of 227° C. and an LVN of 1.1 dl/g. The rate of polymerization was 7.1 kg terpolymer/g Pd hour.

ILLUSTRATIVE EMBODIMENT I

A catalyst composition solution was produced by the sequential addition to 60 ml of acetone, in a nitrogen atmosphere with stirring, 0.12 mmol 1,3-bis[di(2-methoxyphenyl)phosphino]propane, 0.1 mmol palladium acetate and 2 mmol trifluoroacetic acid.

ILLUSTRATIVE EMBODIMENT II

A carbon monoxide/ethylene/propylene terpolymer was produced by a procedure substantially similar to that of Comparative Example II except that 6 ml of the fresh catalyst solution prepared in Illustrative Embodiment I was employed. The yield of terpolymer was 17.7 g and the terpolymer had a melting point of 225° C. and an LVN of 2.1 dl/g. The rate of polymerization was 8.4 kg terpolymer/g Pd hour.

ILLUSTRATIVE EMBODIMENT III

A terpolymer of carbon monoxide, ethylene and propylene was produced by the procedure of Illustrative Embodiment II except that the 6 ml of catalyst solution was taken from a stock solution prepared 30 days prior to use. The yield of terpolymer was 18.0 g. The terpolymer had a melting point of 224° C. and an LVN of 2.3 dl/g. The rate of polymerization was 8.4 kg terpolymer/g Pd hour.

ILLUSTRATIVE EMBODIMENT IV

A catalyst composition solution was produced by the sequential addition to 60 ml of methylacetate, in a nitrogen atmosphere with stirring, of 0.1 mmol palladium acetate, 0.12 mmol 1,3-bis[di(2-methoxyphenyl)phosphino]propane and 2 mmol trifluoroacetic acid.

ILLUSTRATIVE EMBODIMENT V

A terpolymer of carbon monoxide, ethylene and propylene was produced by a procedure substantially similar to that of Comparative Example II except that 6 ml of the catalyst solution prepared in Illustrative Embodiment IV was employed. The yield of terpolymer was 17.8 g and the terpolymer had a melting point of 226° C. and an LVN of 2.2 dl/g. The rate of polymerization was 8.4 kg terpolymer/g Pd hour.

ILLUSTRATIVE EMBODIMENT VI

A carbon monoxide/ethylene/propylene terpolymer was produced by the procedures of Illustrative Embodiment V except that the 6 ml of catalyst solution was taken from a stock solution prepared 30 days prior to use. The yield of terpolymer was 17.5 g and the terpolymer had a melting point of 227° C. and an LVN of 2.1 dl/g. The rate of polymerization was 8.3 kg terpolymer/g Pd hour.

ILLUSTRATIVE EMBODIMENT VII

By a procedure substantially similar to that of Illustrative Embodiment I, catalyst composition solutions were made employing tetrahydrofuran, sulfolane, methyl ethyl ketone, N-methyl-2-pyrrolidone and gamma-butyrolactone as the catalyst composition solvent.

What is claimed is:

1. In the process of producing linear alternating polymer by polymerizing carbon monoxide and at least one ethylenically unsaturated hydrocarbon in a series of polymerizations over time, each of the polymerizations being conducted under polymerization conditions in the presence of an alkanol reaction diluent and a catalyst composition, the improvement of employing in each polymerization a portion of a catalyst composition solution prepared by adding a bidentate ligand of phosphorus containing a non-hydrocarbyl substituent on at least one carbon atom and a palladium alkanoate to an aprotic, polar solvent and subsequently adding a halogenated aliphatic monocarboxylic acid having a pKa below 2, and recovering linear alternating polymer of carbon monoxide and at least one ethylenically unsaturated hydrocarbon of relatively uniform molecular weight from the series of polymerizations.

2. The process of claim 1 wherein the palladium alkanoate is palladium acetate.

3. The process of claim 2 wherein the ligand is 1,3-bis[di(2-methoxyphenyl)phosphino]propane.

4. The process of claim 3 wherein the acid is trifluoroacetic acid.

5. The process of claim 4 wherein the solvent is lower alkanone or alkyl alkanoate.

6. The process of claim 5 wherein the solvent is acetone.

7. The process of claim 5 wherein the solvent is methyl acetate.

8. In the process of producing linear alternating terpolymer by polymerizing carbon monoxide, ethylene and propylene in a series of polymerizations over time, each of the polymerizations being conducted under polymerization conditions in the presence of methanol and a catalyst composition, the improvement of employing in each polymerization a portion of a catalyst composition solution prepared by adding 1,3-bis[di(2-methoxyphenyl)phosphino]propane and palladium acetate to an aprotic, polar catalyst composition solvent and subsequently adding trifluoroacetic acid, and recovering linear alternating terpolymer of carbon monoxide, ethylene and propylene of relatively uniform molecular weight from the series of polymerizations.

9. The process of claim 8 wherein the solvent is acetone.

10. The process of claim 8 wherein the solvent is methyl acetate.

* * * * *